Patented May 20, 1930

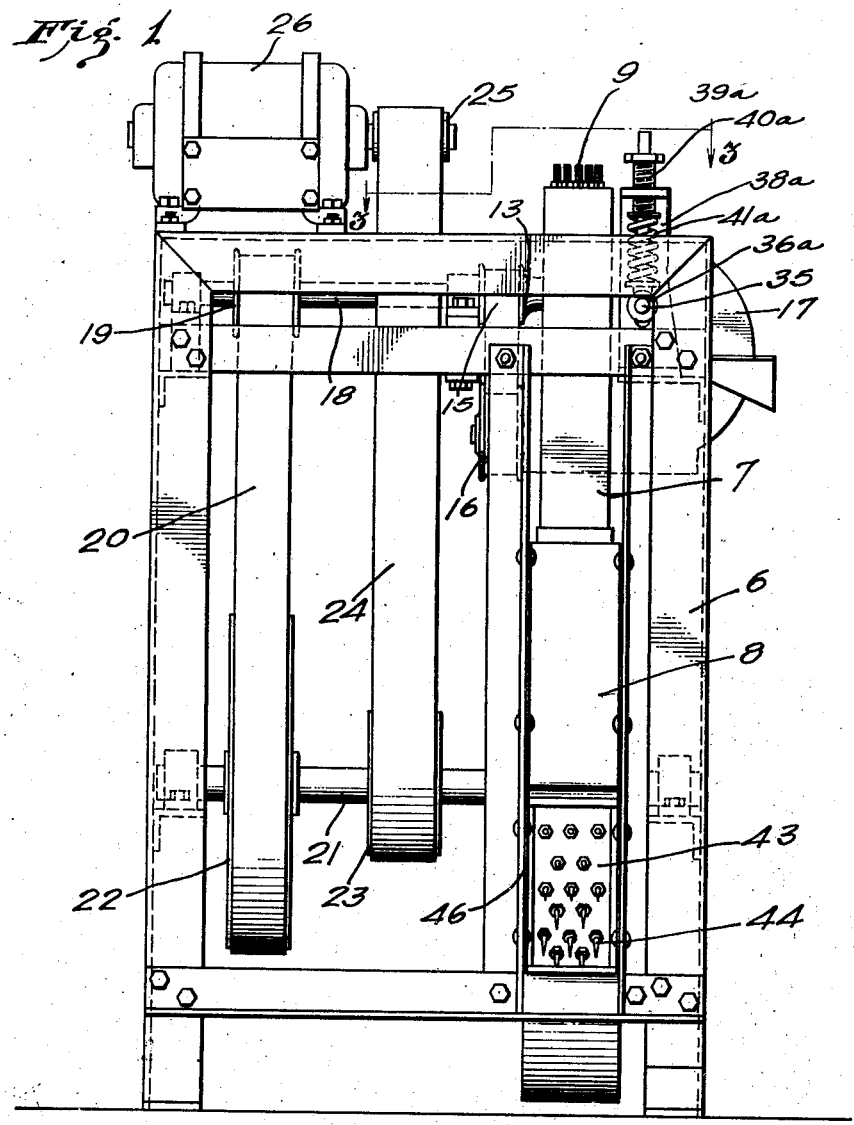

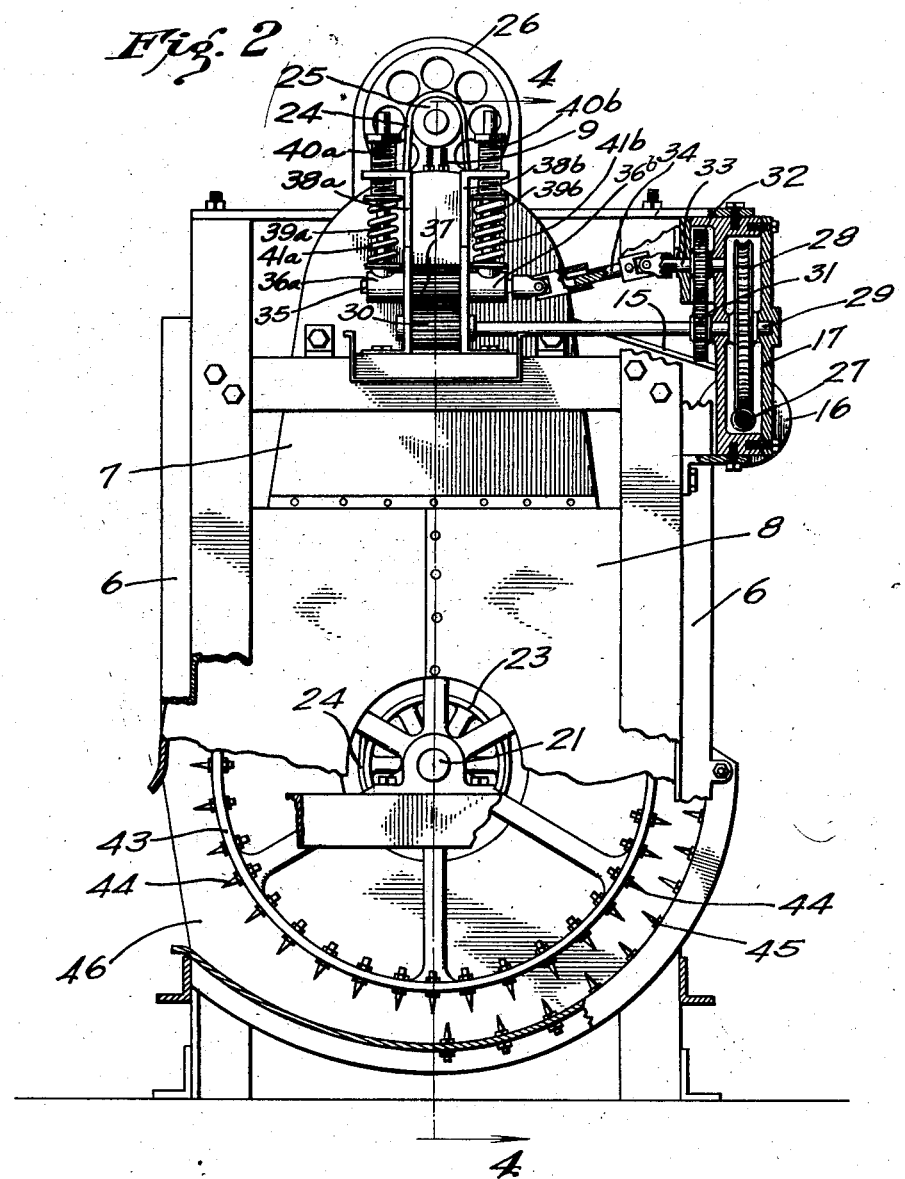

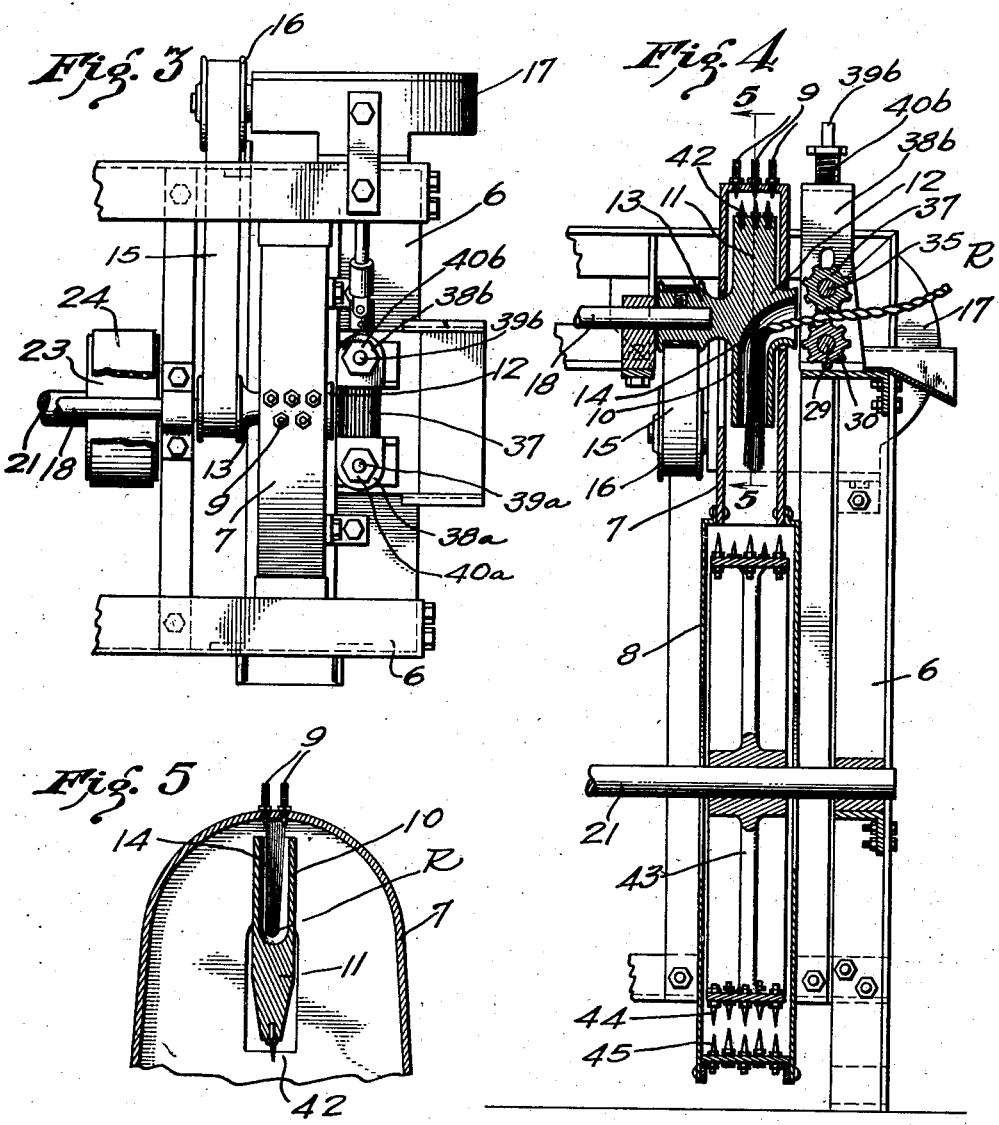

1,759,240

UNITED STATES PATENT OFFICE

MORRIS MUDRICK, OF LOS ANGELES, CALIFORNIA

FIBER-ROPE PICKER

Application filed May 7, 1929. Serial No. 361,062.

This invention relates to a device for untwisting rope. An upholstery filling is made from rope comprising twisted palm fiber. This rope is untwisted, picked and combed to produce curly fiber. Fiber rope is also used to produce fiber for plaster. The present invention appertains to a device which will untwist rope of any character and wherein the rope is fed continuously to the device.

The objects of this invention are to provide a device having any or all of the following features: a rotor which untwists and frays the rope; a rotor of the character described in combination with picking means; and details of structure contributing to compactness, simplicity and durability of construction, large capacity and freedom from choking.

These objects together with other objects and corresponding accomplishments are obtained by means of the embodiment of my invention illustrated in the accompanying drawings, in which:—

Fig. 1 is a side elevation of a complete machine for untwisting and picking palm fiber rope; Fig. 2 is a front elevation with a portion of the housing broken away to show the combing means and gears for the rope feeder; Fig. 3 is a section as seen on the line 3—3 of Fig. 1; Fig. 4 is a section as seen on the line 4—4 of Fig. 2; and Fig. 5 is a section as seen on the line 5—5 of Fig. 4.

Referring with more particularity to the drawings, a frame 6 of any suitable construction is provided to support the various parts of the mechanism. Mounted in the frame is a housing comprising a rotor section 7 and a combing section 8. The rotor section 7 is of dome form opened at the lower portion to the upper part of the combing section. It has alined bores to accommodate the rotor hubs. At the top of the rotor housing are stationary picker teeth 9 having threaded shanks upon which are mounted nuts so that the projection of the teeth into the housing may be adjusted. Disposed within the rotor housing is a rotor having arms 10 and 11 and provided with hubs 12 and 13. A passageway 14 has an inlet axial of the hub and an outlet or discharge mouth opening radially of the arm 10. Hub 13 is formed with a pulley to receive a belt 15 driving a pulley 16 connected to a gearing in a gear box 17. A shaft 18 is connected to the hub 13 and is journalled in the frame having a pulley 19 driven by a belt 20. A counter shaft 21 is journalled in the frame and has mounted thereon pulley 22 over which belt 20 is passed. A second pulley 23 is mounted on shaft 21 and is geared by a belt 24 to a pulley 25 secured to the rotor shaft of an electric motor 26. Thus, the rotor is driven by the electric motor 26, the speed being reduced through the intermediate belts and pulleys. It will be obvious that any system of gearing between the motor 26 and rotor may be resorted to, that shown being illustrative.

Referring to Fig. 2 the gear box is shown with a worm 27 operated from a pulley 16 and meshing with a worm gear 28. Gear 28 is mounted upon a shaft 29 and carries at its end a corrugated feed roller 30 journalled in a frame and stationary in position. A pinion 31 is mounted on the shaft 29 and meshes with a pinion 32 journalled in the gear box by means of a shaft 33. The shaft 33 is connected to a propeller shaft 34 having universal joints and connected to a shaft 35 mounted in bearings 36$^a$ and 36$^b$. Shaft 35 carries a corrugated feed roller 37 coacting with feed roller 30. A sub-frame is mounted on the main frame and includes standards 38$^a$ and 38$^b$ having elongated slots to accommodate bearings 36$^a$ and 36$^b$. The latter has stems connected thereto and marked respectively 39$^a$ and 39$^b$. Stems 39$^a$ and 39$^b$ are slidably mounted in bushings 40$^a$ and 40$^b$. The bushings are threaded and received in corresponding threads in the standards so that the bushings may be adjusted. The bushings have roller spring seats to receive compression springs 41$^a$ and 41$^b$. The long ends of the compression springs are seated on the bearings 36$^a$ and 36$^b$. The arrangement is such that feed roller 37 is resiliently held in cooperating position with feed roller 30 and the line of contact between the feed rollers is in alinement with the inlet of the passage 14 in the rotor. A rope marked R is fed between the feed rollers and held thereby against rotation. As the rope advances into the passage 14, it is turned through an angle and rotation of the rotor will cause the rope to be untwisted fraying it and separating the fiber by centrifugal action. This is aided by the frayed ends coming in contact with the rotor housing. Furthermore, the rope is picked by the teeth 9 as the discharge mouth of the passage sweeps by the picker teeth. In order to clean the picker teeth and aid in picking, arm 11 is provided with teeth 42. The rotor and feed rollers are geared together to cause feeding of the rope commensurate with the untwisting action. It will also be noted that the rotor acts as a centrifugal blower which aids in discharging the fibers from the rotor and from the housing.

Mounted on shaft 21 is a combing wheel 43 having teeth 44 projecting from its rim. These teeth cooperate with combing teeth 45 mounted on the lower part of the combing housing. The combing housing is open to form a discharge as indicated by 46. The picked fiber drops upon the combing wheel and is carried around to the discharge outlet 46 where it is delivered in its final form.

It is obvious that I have provided a rope untwister of compact form which feeds the rope continuously and has a large capacity. The combing mechanism shown herein is not an essential part of the invention. The picked fiber may be delivered to be operated upon by an independent combing device or a combing device of any other construction. It is also obvious, that the specific details of the feeding mechanism may be varied without departing from my invention.

What I claim is:—

1. The combination of a rotor having an arm revoluble therewith, a passage in said rotor having an axial inlet and a discharge mouth at the outer end of said arm, means to feed a rope into said inlet and retain it against rotation whereby the rope is untwisted on rotation of said rotor, normally stationary picker teeth facing the discharge mouth of said rotor passage, and co-operating picker teeth on said rotor disposed to sweep by said first mentioned teeth.

2. The combination of a rotor having an arm revoluble therewith, a passage in said rotor having an axial inlet and a discharge mouth opening through the outer end of one of said arms, the other of said arms having picker teeth extending therefrom, and cooperating picker teeth disposed so that the first mentioned picker teeth and the discharge mouth of said passage will sweep by the last mentioned picker, and means to feed a rope into said inlet and retain it against rotation whereby the rope is untwisted on rotation of said rotor.

3. The combination of a rotor having arms revoluble therewith, a passage in said rotor having an axial inlet and a discharge mouth opening through the outer end of one of said arms, the other of said arms having picker teeth extending therefrom, and cooperating stationary picker teeth disposed so that the first mentioned picker teeth and the discharge mouth of said passage will sweep by the last mentioned picker teeth, and means to feed a rope axially into said passage and retain it against rotation whereby the rope is untwisted on rotation of said rotor and picked by said teeth.

4. The combination of a rotor having arms revoluble therewith, a passage in said rotor having an axial inlet and a discharge mouth opening through the outer end of one of said arms, the other of said arms having picker teeth extending therefrom, cooperating picker teeth disposed so that the first mentioned picker teeth and the discharge mouth of said passage will sweep by the last mentioned picker teeth, and coacting feed rollers to grasp the rope and hold the latter against rotation and feed the rope into said passage whereby the rope is untwisted on rotation of said rotor and picked by said teeth.

5. The combination of a rotor having arms revoluble therewith, a passage in said rotor having an axial inlet and a discharge mouth opening through the outer end of one of said arms, the other of said arms having picker teeth extending therefrom, and stationary picker teeth disposed so that the first mentioned picker teeth and the discharge mouth of said passage will sweep by the last mentioned picker teeth, and coacting feed rollers to grasp the rope and hold the latter against rotation and feed the rope into said passage whereby the rope is untwisted on rotation of said rotor and picked by said teeth.

In witness that I claim the foregoing I have hereunto subscribed my name this 3rd day of April, 1929.

MORRIS MUDRICK.